US012753297B2

(12) United States Patent
Sahni et al.

(10) Patent No.: US 12,753,297 B2
(45) Date of Patent: Oct. 6, 2026

(54) CURABLE COMPOSITION, ADHESIVE, AND METHOD OF MAKING THE SAME

(71) Applicant: 3M INNOVATIVE PROPERTIES COMPANY, St. Paul, MN (US)

(72) Inventors: Vasav Sahni, St. Paul, MN (US); Claire Hartmann-Thompson, Lake Elmo, MN (US); Jacob P. Johnson, St. Paul, MN (US); Jacek W. Dziedzic, Elk Grove Village, IL (US); Thomas E. Augustine, Hager City, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 387 days.

(21) Appl. No.: 18/580,437

(22) PCT Filed: Aug. 18, 2022

(86) PCT No.: PCT/IB2022/057756
§ 371 (c)(1),
(2) Date: Jan. 18, 2024

(87) PCT Pub. No.: WO2023/052864
PCT Pub. Date: Apr. 6, 2023

(65) Prior Publication Data
US 2024/0309191 A1 Sep. 19, 2024

Related U.S. Application Data

(60) Provisional application No. 63/251,254, filed on Oct. 1, 2021.

(51) Int. Cl.
*C08L 23/26* (2025.01)
*C08J 3/24* (2006.01)
*C09J 123/26* (2006.01)

(52) U.S. Cl.
CPC ................. *C08L 23/26* (2013.01); *C08J 3/24* (2013.01); *C09J 123/26* (2013.01); *C08J 2323/22* (2013.01)

(58) Field of Classification Search
None
See application file for complete search history.

(56) References Cited

U.S. PATENT DOCUMENTS 5,276,094 A * 1/1994 Kaszas .................. C08F 297/06 525/88
5,663,245 A 9/1997 Kennedy et al.
7,858,690 B2 12/2010 Chen
8,882,945 B2 11/2014 Joly et al.
2020/0123419 A1 4/2020 Baetzold et al.
2022/0010154 A1 1/2022 Hartmann-Thompson et al.

FOREIGN PATENT DOCUMENTS

JP H05295053 A * 11/1993
JP H0757865 B2 * 6/1995 ............ C09J 153/00
JP 2000096019 A * 4/2000
JP 2000144087 A * 5/2000
JP 4130983 B2 * 8/2008 .......... C08F 297/046
WO 2012074733 A1 6/2012
WO 2015031246 A1 3/2015
WO 2020109954 A1 6/2020
WO 2020121135 A1 6/2020

OTHER PUBLICATIONS

Bacon, "Isobutylene-Rich Imidazolium lonomers for Use in Two-Phase Partitioning Bioreactors", Green Chemistry, 2016, vol. 18, pp. 6586-6595.
Drobny, "5 Electron Beam Processing of Commercial Polymers, Monomers, And Oligomers", Ionizing Radiation and Polymers, 2012, pp. 101-146.
Green, Industrial Photoinitiators—A Technical Guide, (2010), 86-91.
International Search report for PCT International Application No. PCT/IB2022/057756, mailed on Oct. 31, 2022, 3 pages.
Parada, "Synthesis, Characterization, and Photopolymerization of (Meth)Acrylate-Functional Polyisobutylene Macromers Produced by Cleavage/Alkylation of Butyl Rubber", Journal of Polymer sciences, 2020, vol. 58, pp. 2807-2822.
Pocius, "Adhesion and Adhesives Technology", Hanser, 2002, pp. 241.
Yang, "Synthesis, Characterization, and Photopolymerization of Polyisobutylene Phenol (Meth)acrylate Macromers" Macromolecules, 2016, vol. 49, pp. 6173-6185.

* cited by examiner

*Primary Examiner* — Sanza L. McClendon
(74) *Attorney, Agent, or Firm* — Julie Lapos-Kuchar

(57) ABSTRACT

A crosslinkable composition comprises components: (a) at least one polymer comprising isobutylene monomer units: and (b) at least one star polymer represented by the formula $SiR_n(OSi(R)_2\text{-PIB-T})_{4-n}$. Each R independently represents a hydrocarbyl group having from 1 to 6 carbon atoms. Each PIB independently represents a divalent polymeric segment comprising isobutylene monomer units. Each T independently represents a monovalent terminal group, and n is 0 or 1. An adhesive comprising a crosslinked reaction product of the crosslinkable composition and a method of making the adhesive are also disclosed.

20 Claims, No Drawings

CURABLE COMPOSITION, ADHESIVE, AND METHOD OF MAKING THE SAME

BACKGROUND

Handheld electronic devices utilize ever faster data processing rates, enhanced graphics, and more powerful batteries. At the same time, the thickness of the devices decreases with minor changes to length and width. As space for computing components is a premium, it is advantageous to have adhesives which serve a dual purpose: (i) adhering the device components together, including at elevated temperatures; and (ii) providing a nonconductive layer in which the low permittivity of the adhesive prevents electrical charge buildup between device components.

SUMMARY

Crosslinkable compositions according to the present disclosure can be chemically crosslinked to form adhesives according to the present disclosure. Advantageously, the adhesives may high cohesive strength and peel adhesion at elevated temperatures (e.g., 150° C.). By virtue of their composition the adhesives may have a lower relative permittivity than most polyacrylate or polyurethane-based adhesives, which makes them uniquely suited for adhering parts within handheld electronic devices that require little electrical charge between components within the device.

In one aspect, the present disclosure provides a crosslinkable composition comprising components:

(a) at least one polymer comprising isobutylene monomer units; and (b) at least one star polymer represented by the formula $$SiR_n(OSi(R)_2\text{—}PIB\text{-}T)_{4\text{-}n}$$

wherein:

each R independently represents a hydrocarbyl group having from 1 to 6 carbon atoms;

each PIB independently represents a divalent polymeric segment comprising isobutylene monomer units;

each T independently represents a monovalent terminal group; and n is 0 or 1.

In another aspect, the present disclosure provides an adhesive comprising a crosslinked reaction product of components comprising:

(a) at least one polymer comprising isobutylene monomer units; and (b) at least one star polymer represented by the formula;

(b) at least one star polymer represented by the formula $$SiR_n(OSi(R)_2\text{—}PIB\text{-}T)_{4\text{-}n}$$

wherein:

each R independently represents a hydrocarbyl group having from 1 to 6 carbon atoms;

each PIB independently represents a divalent polymeric segment comprising isobutylene monomer units;

each T independently represents a monovalent terminal group; and n is 0 or 1.

In some embodiments, the components in each of the above aspects further include a Type II photoinitiator.

In yet another aspect, the present disclosure provides a method of making an adhesive, the method comprising exposing a curable composition according to the present disclosure to actinic radiation effective to cause crosslinking of the crosslinkable composition.

As used herein:

the term "isobutylene" is equivalent to "isobutene" and has the structural formula

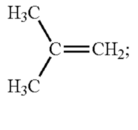

the term "isobutylene monomer unit " refers to a divalent monomer unit having the structural formula

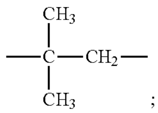

;

the term "star polymer" refers to a branched polymer with a general structure consisting of several (at least three) linear polymeric chains connected to a central core; and the term "Type II photoinitiator" refers to a Norrish Type II photoinitiator; and Features and advantages of the present disclosure will be further understood upon consideration of the detailed description as well as the appended claims.

DETAILED DESCRIPTION

Curable compositions and adhesives include directly or indirectly components (a) and (b), at least one polymer comprising isobutylene monomer units and a star polymer as described above, respectively.

Useful polymers comprising isobutylene monomer units (component (a)) may be homopolymers or copolymers with one or more additional polymerizable monomers (preferably hydrocarbon monomers). The copolymers may be random or block copolymers and may have any molecular weight, $M_n$ or $M_w$. Often, $M_n$ and/or $M_w$ is/are at least 10000 grams/mole, preferably at least 30000 grams/mole.

Exemplary polymers comprising isobutylene monomer units include polyisobutylene (PIB), butyl rubber (a copolymer of isobutylene and isoprene, in a weight ratio of approximately 98:2), styrene-block-isobutylene-block-styrene (SIS) rubber, random copolymers of isobutylene with styrene and/or α-methyl-styrene, isobutylene-butene copolymers, isobutylene-butadiene copolymers, and copolymers of isobutylene with ethylene and/or propylene. Combinations of polymers comprising isobutylene monomer units may also be used. As is typical with all polymers, end-groups resulting from initiation and termination of polymerization will be present and are not limited. Examples may include H, F, OH, and alkyl or alkoxy groups having from 1 to 6 carbon atoms. Isobutylene-based polymers such as those described above are widely available from commercial suppliers and can be made according to known methods.

Often, the amount of polymer(s) comprising isobutylene monomer units (component (a)) in curable compositions and adhesive according to the present disclosure is at least 70 weight percent, at least 75 weight percent, at least 80 weight percent, or even at least 90 weight percent based on the total weight of components (a) and (b), although other amounts may also be used.

Component (b) is a star polymer represented by the formula $SiR_n(OSi(R)_2\text{-PIB-T})_{4-n}$.

Each R independently represents a hydrocarbyl group having from 1 to 6 carbon atoms (e.g., methyl, ethyl, propyl, butyl, pentyl, hexyl, or phenyl). Often, R is methyl or ethyl.

Each PIB independently represents a divalent polymeric segment comprising isobutylene monomer units. The polymeric segment may be of the same type as in component (a) described above exclusive of end groups. Each PIB may independently have a different or identical length.

Each T independently represents a monovalent terminal group. Examples may include H, F, OH, and alkyl or alkoxy group having 1 to 6 carbon atoms (e.g., methyl, ethyl, propyl, butyl, pentyl, hexyl, methoxy, ethoxy, propoxy, t-butoxy, pentoxy, hexoxy).

n is 0 or 1 (i.e., a star with three or four arms).

Star polymers useful in practice of the present disclosure can be prepared, for example, according to the following hydrosilylation method

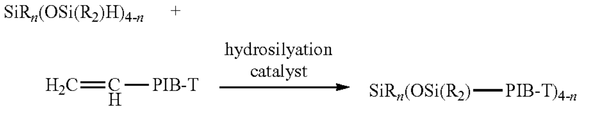

wherein R, PIB, T, and n are as previously defined.

Compounds of the formula $SiR_n(OSi(R)_2\text{-PIB-T})_{4-n}$ can be made by known methods, and a number are commercially available. Examples include phenyltris(dimethylsiloxy)silane, ethyltris(dimethylsiloxy)silane, propyltris(dimethylsiloxy)silane, and tetrakis(dimethylsiloxy)silane (e.g., as available from Gelest, Inc., Morrisville, Pennsylvania); and ethyltris(dimethylsiloxy)silane (e.g., as available from Alfa Chemistry, Ronkonkoma, New York).

Useful hydrosilylation catalysts include, for example, platinum-based catalysts, such as chloroplatinic acid, a solution of chloroplatinic acid in an alcohol, the reaction product of chloroplatinic acid and an alcohol, the reaction product of chloroplatinic acid and an olefin compound, the reaction product of chloroplatinic acid and a vinyl group-containing siloxane, platinum-olefin complexes, platinum-vinyl group-containing siloxane complexes; and platinum group-based catalysts, such as a rhodium complex and a ruthenium complex. One particularly useful catalyst (Karstedt's catalyst) is a platinum-divinyltetramethyldisiloxane complex in vinyl-terminated polydimethylsiloxane (PDMS), containing between 3 weight percent platinum concentration (concentration of pure platinum metal), obtained under the product code SIP6830.3 from Gelest, Morrisville, Pennsylvania. The hydrosilylation catalysts may be used by dissolving or dispersing in a solvent such as isopropanol or toluene, or a silicone oil.

The amount of the hydrosilylation catalyst can be generally about 5 ppm or greater, or about 10 ppm or greater, and about 2.000 ppm or less, or about 500 ppm or less based on 100 parts by weight of the solid content of the silicone pressure-sensitive adhesive, as determined by the weight of platinum group metal.

In many embodiments, one or more Type II photoinitiators (i.e., component (c)) are combined with components (a) and (b). Type II photoinitiators abstract H-atoms when photoexcited to generate radical pairs that may result in crosslinking reactions.

Type II photoinitiators are well known in the photocuring art. Type II photoinitiators of commercial importance include: diaryl ketones (e.g., benzophenone, 4-methylbenzophenone, or 4-chlorobenzophenone); 1-phenylpropane-1, 2-dione (PPD); thioxanthones (2-isopropylthioxanthone, 2-mercaptothioxanthone. 2,4-diethylthioxanthone (DETX), 1-chloro-4-propoxythioxanthone (CPTX), and 2-chlorothioxanthone (CTX), or 4-isopropylthioxanthone); camphorquinone; benzil; naphthoquinones (e.g., 2,2'-bis (3-hydroxy-1,4-naphthoquinone)), anthraquinones (e.g., anthraquinone, 1,4-dihydroxyanthraquinone, 2-methylanthraquinone, or 2,6-dihydroxyanthraquinone), and 3-ketocoumarins or a combination thereof. Other Type II photoinitiators are described in Green. A. W., Commercial Photoinitiators. *Industrial Photoinitiators, A Technical Guide* (2010), CRC Press. Taylor and Francis Group, pp. 86-91.

The absorption characteristics of the Type II photoinitiator(s) will typically be selected depending at least in part on the desired wavelengths of the actinic radiation selected. Generally, the actinic radiation will be in the ultraviolet (i.e., 200 to less than 400 nanometers) and/or visible (i.e., 400 to 700 nanometers) wavelength range. although this is not a requirement. A preferred wavelength range is 250 to 450 nanometers.

The Type II photoinitiator may be used in any amount, preferably 0.01 to 10 weight percent, more preferably 0.1 to 5 weight percent, and more preferably 0.1 to 2 weight percent, based on the total weight of the crosslinkable composition.

While many formulations are permissible, in some preferred compositions the crosslinkable composition comprises:

80 to 98.9 weight percent of component (a);
1 to 15 weight percent of component (b); and
optionally 0.1 to 5 weight percent of component (c),
based on the total weight of components (a), (b), and (c).

In some preferred compositions the crosslinkable composition comprises:

87 to 94.5 weight percent of component (a);
7 to 12 weight percent of component (b); and
optionally 0.5 to 3 weight percent of component (c),
based on the total weight of components (a), (b), and (c).

The crosslinkable composition and also the adhesive may contain optional additives. Examples include fillers (e.g., thermal fillers and/or electrically-conductive fillers), thixotropes. plasticizers. colorants, fragrances, antioxidants, ultraviolet (UV) light stabilizers, and/or tackifiers.

Particularly, if it is desired that the adhesive is a pressure-sensitive adhesive (e.g., at 20° C.) it may be desirable to include one or more tackifiers in the adhesive (and correspondingly typically in the crosslinkable composition). Pressure sensitive adhesives are well known to one of ordinary skill in the art to possess properties including the following: (1) aggressive and permanent tack. (2) adherence with no more than finger pressure. (3) sufficient ability to hold onto an adherend, and (4) sufficient cohesive strength to be removed cleanly from the adherend.

Exemplary tackifiers include aliphatic esters of natural and modified rosins and the hydrogenated derivatives thereof (e.g., a glycerol ester of tall oil rosin marketed as PERMALYN 2085 and a glycerol ester of hydrogenated gum rosin marketed as FORAL 5-E, both available from Eastman Chemical Company, and an aliphatic rosin ester dispersion obtained as AQUATAC 6085 from Arizona Chemical. Jacksonville, Florida), hydrogenated rosin resins (e.g., partially hydrogenated rosin is produced by Eastman Chemical Company as STAYBELITE-E and completely hydrogenated rosin is branded as FORAL AX-E), dimerized rosin resins (e.g., POLY-PALE partially dimerized rosin is a partially dimerized rosin product offered by Eastman Chemical Company). and aliphatic modified rosin resins (e.g., maleic anhydride modified rosin resins marketed as LEWISOL 28-M or LEWISOL 29-M).

Additional examples include aliphatic hydrocarbon resin tackifiers derived from liquid C5 feedstock by Lewis acid catalyzed polymerization, and hydrogenated derivatives thereof. Commercially available aliphatic hydrocarbon resin tackifiers include those marketed by Eastman Chemical Company. Kingsport, Tennessee, under the trade designations PICCOTAC 1020, PICCOTAC 1095, PICCOTAC 1098, PICCOTAC 1100, and PICCOTAC 1115, and in hydrogenated forms as EASTOTAC H-100E. EASTOTAC H-115E and EASTOCTAC H-130E.

Tackifier may be included in any effective amount (e.g., 10 to 50 percent based on the total weight of the crosslinkable composition and/or adhesive), which can be readily determined by those of skill in the art. Other amounts of tackifier may also be used.

Crosslinking of the crosslinkable composition may be accomplished by exposure to actinic radiation with greater exposure typically resulting in increased crosslinking. In some embodiments (and especially those in which no Type-II photoinitiator is present), the actinic radiation may comprise electron beam radiation. In crosslinkable compositions that include a Type II photoinitiator. ultraviolet light (e.g., as supplied by a microwave-driven mercury lamp or mercury arc lamp) is typically a useful choice as actinic radiation.

Crosslinkable compositions may be disposed between to substrates and then crosslinked, but more typically they are coated onto a releasable liner and then crosslinked, for example, as described above to form a layer of adhesive (e.g., pressure-sensitive adhesive) that can then be transferred to a substrate and used for bonding.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Table 1 (below) reports abbreviations, descriptions, and source of materials used in the examples

TABLE 1

| ABBREVIATION | DESCRIPTION | SOURCE |
|---|---|---|
| B268S | a copolymer of isobutylene and isoprene having a characteristic specific gravity of 0.92, obtained as EXXON BUTYL 268S | ExxonMobil, Irving, Texas |
| B15 | polyisobutylene, $M_W$ = 120 kPa, obtained as Oppanol B15 | BASF Corporation, Florham Park, New Jersey |
| E5340 | cycloaliphatic Hydrocarbon resin tackifier obtained as Escorez 5340 | Exxonmobil Chemical, Houston, Texas |
| N50 | polyisobutene, $M_W$ = 565 kDa, obtained as OPPANOL N 50 | BASF Corporation |
| SIBS 102T | a wholly saturated styrene-isobutylene block (SIBS) copolymer, $M_n$ = 137 kDa, obtained as SIBSTAR 102T | Kaneka, Tokyo, Japan |
| BP | benzophenone | BASF Corporation |
| PIB2 | a low color, non-drying polyisobutylene polymer having a molecular weight of 1050 Daltons, obtained as TPC 1105 | TPC Group, Houston, Texas |
| PIB3 | polyisobutylene with a viscosity range of 75-95 cSt and a molecular weight of 750 Daltons, obtained as TPC 175 | TPC Group |
| | tetrakis(dimethylsiloxysilane) | Gelest, Inc., Morrisville, Pennsylvania |
| | methyltris(dimethylsiloxy)silane | Gelest, Inc. |
| | platinum divinyltetramethyldisiloxane complex | Gelest, Inc. |
| RF02N | a 2 mils (51 microns) thick siliconized polyethylene terephthalate release liner, obtained as RF02N | SKC Haas, Seoul, Korea |
| RF22N | a 2 mils (51 microns) thick siliconized polyethylene terephthalate release liner, obtained under the product name RF22N | SKC Haas |
| | hexanes | EMD Millipore, Burlington, Massachusetts |
| | xylene | EMD Millipore |
| | toluene | EMD Millipore |

Cohesive Integrity Test Method (tan delta)

Specimens were evaluated for their tan delta at 150° C. using a rheological dynamic analyzer (Model DHR-3 Rheometer, which is available from TA Instruments, New Castle, Delaware). Example specimens (prepared as described hereinbelow) were laminated to a thickness of approximately 1 millimeter (0.039 inches). Specimens were then punched out using an 8 mm (0.315 inch) diameter circular die and adhered onto an 8 millimeter diameter upper parallel plate after removal of the release liner. The plate with polymeric film was positioned between the clamps, and the polymeric film compressed until the edges of the specimen were uniform with the edges of the top plate. The temperature was then equilibrated at the test temperatures for 2 minutes at a nominal axial force of 0 grams +/−15 grams. After two minutes, the axial force controller was disabled in order to maintain a fixed gap during the remainder of the test. The specimen was oscillated at 1 Hz and was taken from −50° C. to 150° C. at 3° C./min. Tan delta values at 150° C. were recorded.

Haze Measurements

All measurements were carried out according to ASTM D 1003-92 requirements using a HunterLab Ultrascan Pro instrument from HunterLab, Reston, Virginia. LCD glass slides (Swift Glass, Elmira Heights, New York) were used throughout the tests. Each glass slide was cleaned with solvent and dried using Kimwipes (Kimberly-Clark, Irving, Texas). In a typical procedure, an adhesive specimen was cut into a rectangle with minimum dimensions 2.75 inches×1.75 inches to span the entrance port of the instrument. The easy liner (RF02N) was removed from the example specimen before the specimen was laminated onto the glass slide using a rubber roller, leaving no bubbles after the lamination. The specimen was then let stand for 15 minutes at 65° C. and 90% relative humidity before the tight (RF22N) liner was removed by pulling the tape, leaving only the adhesive on the glass slide. Haze measurements were then carried out with the clear glass slide used as a control. Haze values below 3 were desired for successful OCA application.

180° Peel Strength Measurement

The RF02N liner was removed and the adhesive layer was adhered onto a 50 microns thick Hostaphan RN 50 polyethylene terephthalate (Mitsubishi International. Tokyo, Japan) backing which was then sized to a width of 1 cm and a length of at least 30 cm. The remaining RF22N liner was removed and the adhesive was applied to an LCD glass panel (Fisherfinest, Pittsburgh, Pennsylvania) using light finger pressure. Next, the test sample was rolled four times with a standard FINAT test roller (weight 2.0 kg) at a speed of approximately 10 mm per second to obtain intimate contact between the adhesive and the surface. The test specimens were allowed to stand for 24 hours at ambient room temperature (23° C. +/−2° C., 50% relative humidity +/−5%) prior to testing. For 180° peel strength testing the test specimen was clamped in the lower movable jaw of a tensile tester (Instron 3365, Instron, Norwood, Massachusetts). The adhesive film strip was folded back at an angle of 180° and the free end was clamped in the upper jaw of the tensile tester in a configuration commonly utilized for 180° measurements. The tensile tester was set at 300 millimeters per minute jaw separation rate. The temperature in the oven was set at 65° C. and the sample was equilibrated for 15 minutes before starting the test. Test results are expressed in Newtons/centimeter (N/cm). The quoted peel values are the average of three replicate 180°-peel measurements. The failure mode was also recorded.

Preparation of SP1

A solution of PIB3 (34.28 g, 0.043 mol terminal alkene, $M_n$=791 grams/mole) and tetrakis(dimethylsiloxy)silane (3.58 g, 0.043 mol SiH) was prepared in hexanes (35 mL), and 1 drop platinum divinyltetramethyldisiloxane complex in xylenes (2.1-2.4 weight percent Pt) was added. The reaction mixture was stirred at 50° C. for 5 days, and hexane was removed in vacuo to give the product as a viscous liquid.

Preparation of SP2

A solution of PIB2 (19.75 g, 0.019 mol terminal alkene, $M_n$=1040 grams/mole) and tetrakis(dimethylsiloxy)silane (1.60 g, 0.019 mol SiH) was prepared in hexanes (40 mL), and 1 drop platinum divinyltetramethyldisiloxane complex in xylenes (2.1-2.4 weight percent Pt) was added. The reaction mixture was stirred at 60° C. for 5 days, and hexane was removed in vacuo to give the product as a viscous liquid.

Preparation of SP3

A solution of polyisobutylene oligomer 3 (29.1g, 0.037 mol terminal alkene, $M_n$=791) and methyltris(dimethylsiloxy)silane (3.28 g, 0.037 mol SiH) was prepared in hexane (30 mL), and 1 drop platinum divinyltetramethyldisiloxane complex in xylene (2.1-2.4% Pt) was added. The reaction mixture was stirred at 50° C. for 2 days, and hexane was removed in vacuo to give the product as a viscous liquid.

Examples

For preparing specimens, materials (as shown in Table 2) were added in a glass vial with toluene to make a solution with 40% solids. The vial was sealed and the contents were mixed overnight. The solution was then coated on a RF22N release liner using a knife coater with a gap of 6 mils (152 microns). The coated specimen was placed in an oven at 70° C. for 15 minutes. After this, the specimen was laminated with RF02N. To crosslink, the coated and laminated specimen was exposed to the UV radiation (using what): UVA of 4 J/$cm^2$.

Table 2 (below) reports components, UVA dose setting, and test results for Examples 1 to 12.

TABLE 2

| EXAMPLES | COMPONENT, parts by weight B268 | B15 | N50 | SIBS 102T | SP1 | SP2 | SP3 | E5340 | BP | UVA DOSE, J/$cm^2$ | HAZE haze units | TAN DELTA, at 150° C. |
|---|---|---|---|---|---|---|---|---|---|---|---|---|
| 1 | 90 | | | | 10 | | | | 1 | 0 | 0.61 | 0.61 |
| 2 | 90 | | | | 10 | | | | 1 | 4 | 0.63 | 0.48 |
| 3 | 90 | | | | | 10 | | | 1 | 0 | 0.72 | 0.61 |
| 4 | 90 | | | | | 10 | | | 1 | 4 | 0.51 | 0.51 |
| 5 | | | 90 | | 10 | | | | 1 | 0 | 0.41 | 0.90 |
| 6 | | | 90 | | 10 | | | | 1 | 4 | 0.48 | 0.81 |
| 7 | | | 90 | | | 10 | | | 1 | 0 | 0.54 | 0.90 |
| 8 | | | 90 | | | 10 | | | 1 | 4 | 0.38 | 0.83 |

TABLE 2-continued

| | COMPONENT, parts by weight | | | | | | | | | UVA DOSE, | HAZE | TAN DELTA, |
|---|---|---|---|---|---|---|---|---|---|---|---|---|
| EXAMPLES | B268 | B15 | N50 | SIBS 102T | SP1 | SP2 | SP3 | E5340 | BP | J/cm$^2$ | haze units | at 150° C. |
| 9 | | | | 90 | 10 | | | | 1 | 0 | 0.71 | 1.90 |
| 10 | | | | 90 | 10 | | | | 1 | 4 | 0.68 | 1.51 |
| 11 | | | | 90 | | 10 | | | 1 | 0 | 0.68 | 1.89 |
| 12 | | | | 90 | | 10 | | | 1 | 4 | 0.69 | 1.61 |
| 13 | 90 | | | | | | 10 | | 1 | 0 | 0.62 | 0.62 |
| 14 | 90 | | | | | | 10 | | 1 | 4 | 0.64 | 0.55 |
| 15 | 40 | 35 | | | 10 | | | 25 | 1 | 0 | 0.68 | 1.6 |
| 16 | 40 | 35 | | | 10 | | | 25 | 1 | 4 | 0.67 | 1.1 |
| A | 99 | | | | | | | | 1 | 0 | 0.71 | 0.49 |
| B | 99 | | | | | | | | 1 | 4 | 0.72 | 0.50 |
| C | | | | 99 | | | | | 1 | 0 | 0.58 | 0.40 |
| D | | | | 99 | | | | | 1 | 4 | 0.59 | 0.42 |

Examples 15 and 16 were tested according to the 180° Peel Strength Measurement procedure (hereinabove). Example 15 failed cohesively at 0.3 N/cm and Example 16 failed adhesively at 0.9 N/cm.

The preceding description, given in order to enable one of ordinary skill in the art to practice the claimed disclosure, is not to be construed as limiting the scope of the disclosure, which is defined by the claims and all equivalents thereto.

What is claimed is:

1. A crosslinkable composition comprising components:

(a) at least one polymer comprising isobutylene monomer units; and (b) at least one star polymer represented by the formula $$SiR_n(OSi(R)_2—PIB—T)_{4-n}$$

wherein:

each R independently represents a hydrocarbyl group having from 1 to 6 carbon atoms;

each PIB independently represents a divalent polymeric segment comprising isobutylene monomer units;

each T independently represents a monovalent terminal group; and n is 0 or 1.

2. The crosslinkable composition of claim 1, wherein the components further comprise:

(c) a Type II photoinitiator.

3. The crosslinkable composition of claim 2, wherein the Type II photoinitiator comprises benzophenone.

4. The crosslinkable composition of claim 2, wherein based on the total weight of components (a), (b), and (c), the crosslinkable composition comprises:

80 to 98.9 weight percent of component (a);

1 to 15 weight percent of component (b); and 0.1 to 5 weight percent of component (c).

5. The crosslinkable composition of claim 2, wherein based on the total weight of components (a), (b), and (c), the crosslinkable composition comprises:

87 to 94.5 weight percent of component (a);

7 to 12 weight percent of component (b); and 0.5 to 3 weight percent of component (c).

6. The crosslinkable composition of claim 1, wherein R represents methyl or ethyl.

7. The crosslinkable composition of claim 1, wherein n is 1.

8. The crosslinkable composition of claim 1, wherein n is 0.

9. The crosslinkable composition of claim 1, wherein T is selected from the group consisting of H, F, and hydrocarbyl groups having 1 to 6 carbon atoms.

10. An adhesive comprising a crosslinked reaction product of components comprising:

(a) at least one polymer comprising isobutylene monomer units; and (b) at least one star polymer represented by the formula $$SiR_n(OSi(R)_2—PIB—T)_{4-n}$$

wherein:

each R independently represents a hydrocarbyl group having from 1 to 6 carbon atoms;

each PIB independently represents a divalent polymeric segment comprising isobutylene monomer units;

each T independently represents a monovalent terminal group; and n is 0 or 1.

11. The adhesive of claim 10, wherein the components further comprise:

(c) Type II photoinitiator.

12. The adhesive of claim 11, wherein the Type II photoinitiator comprises benzophenone.

13. The adhesive of claim 11, wherein based on the total weight of components (a), (b), and (c), the components comprise:

80 to 98.9 weight percent of component (a);

1 to 15 weight percent of component (b); and 0.1 to 5 weight percent of component (c).

14. The adhesive of claim 11, wherein based on the total weight of components (a), (b), and (c), the components comprise:

87 to 94.5 weight percent of component (a);

7 to 12 weight percent of component (b); and 0.5 to 3 weight percent of component (c).

15. The adhesive of claim 10, wherein R represents methyl or ethyl.

16. The adhesive of claim 10, wherein n is 1.

17. The adhesive of claim 10, wherein n is 0.

18. The adhesive of claim 10, wherein T is selected from the group consisting of H, F, and hydrocarbyl groups having 1 to 6 carbon atoms.

19. The adhesive of claim 10, wherein the adhesive is a pressure sensitive adhesive at 20° C.

20. A method of making an adhesive, the method comprising exposing a curable composition according to claim 1 to actinic radiation effective to cause crosslinking of the crosslinkable composition.

* * * * *